Nov. 8, 1966  W. E. BENSON, JR  3,284,706
FIELD-MASKING IN CAPACITIVE MOISTURE-CONTENT
MEASUREMENTS OF OBJECTS HAVING METAL STRAPS
Filed March 27, 1964  2 Sheets-Sheet 1

INVENTOR.
WARREN E. BENSON JR.
BY
Dike, Thompson, Bronstein & Mrose
ATTORNEYS

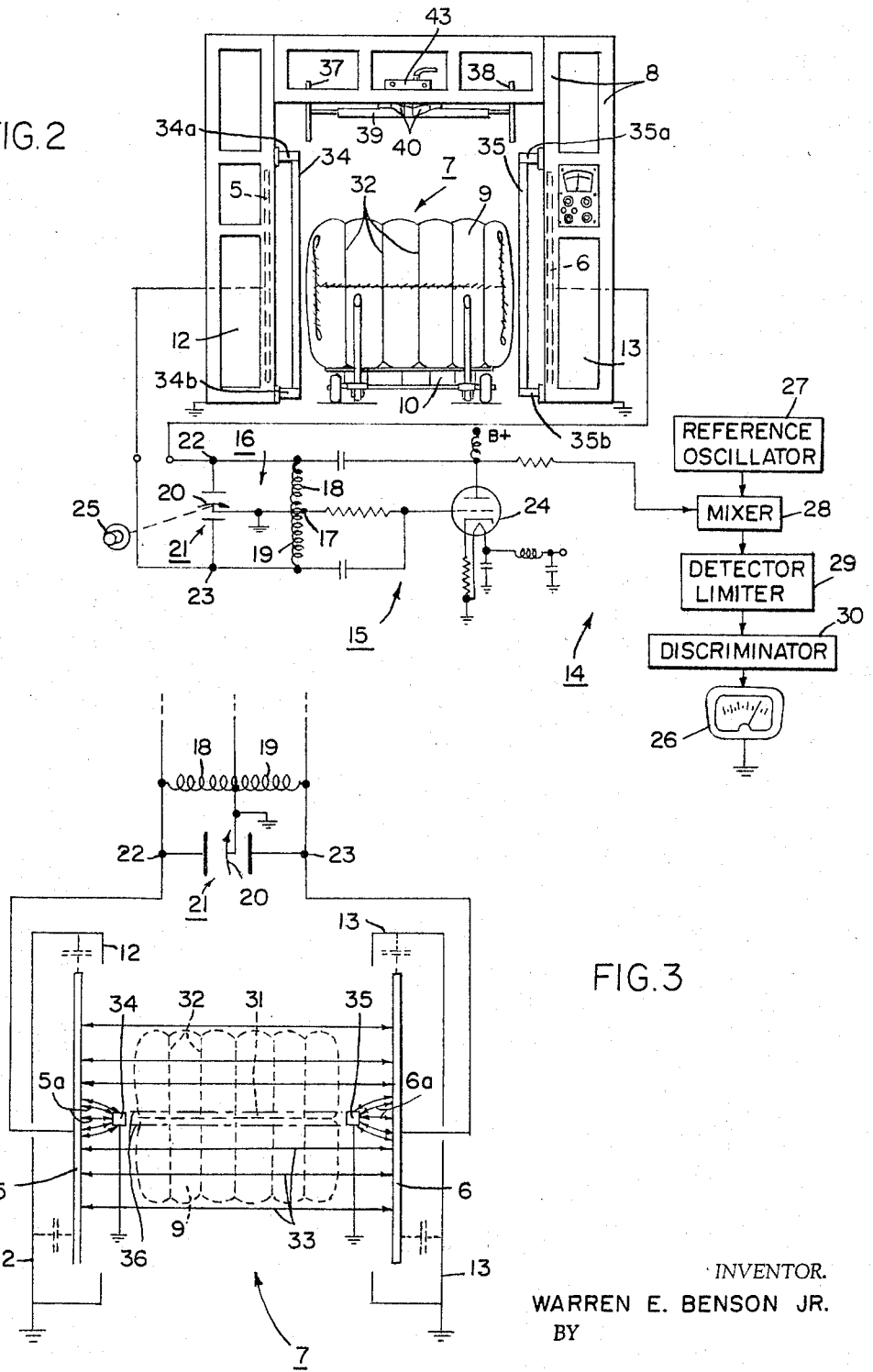

United States Patent Office 3,284,706
Patented Nov. 8, 1966

3,284,706
FIELD-MASKING IN CAPACITIVE MOISTURE-CONTENT MEASUREMENTS OF OBJECTS HAVING METAL STRAPS
Warren E. Benson, Jr., Needham, Mass., assignor, by mesne assignments, to Forté Engineering Corporation, Norwood, Mass., a corporation of Delaware
Filed Mar. 27, 1964, Ser. No. 355,278
16 Claims. (Cl. 324—61)

The present invention relates to improvements in the measurement of those characteristics of items which are related to capacitivities thereof; i.e. the effect upon capacity of an electrical capacitor, and, in one particular aspect, to novel and improved moisture detection apparatus wherein a unique test cell structure provides measurement isolations from deleterious effects of conductive metallic strapping on samples under evaluation.

It is known that important properties of materials, such as moisture content, density, and compositions, are related to their exhibited dielectric constants; based upon this recognition, these properties may be conveniently assessed through use of electronic detection equipment associated with and responding to the capacitivities of capacitive test cells in which the evaluated materials are placed. Moisture content, for example, may be swiftly and simply measured in this manner whereas the usual alternative involves baking, weighing, and calculating practices which are tedious, costly and highly inconvenient. The accurate determination of moisture content, in particular, is a matter of great importance in such industries as those concerned with the processing of textiles, chemicals, and foodstuffs, where existing percentages of moisture may be critical in storage and processing, and where the actual material yields must be distinguished from associated water content.

Insofar as possible, the capacitor test cells which are used in obtaining capacitivity information should be rendered immune to errors both from variations in their stray fields and from any unintended field disturbances caused by the measured samples themselves. These factors suggest that the cell should be of small size and lend itself to full closure, with only small isolated portions of the evaluated substances being investigated at any time. However, unless the measured portions have characteristics identical with those of the remainder of the bulk or batch from which they are taken, substantial errors can result. In the textile industry, for example, it commonly occurs that portions taken from the exterior or ends of bulk amounts of material have moisture contents significantly different from those elsewhere, and, unless one either permits the moisture to distribute itself uniformly throughout the bulk over a long period of time, or integrates the results of numerous measurements throughout the bulk, the evaluations can be worthless. Thus there are obviously important savings in time and labor when a large undisturbed bulk of material can be measured directly. Even so, a major difficulty is encountered in those instances where the sample is bound with metallic wire or strapping, as is very often the case with massive bales, cartons, and the like, because the metallic strapping represents a particularly economical and effective means for binding together large, awkward, and weighty quantities of material. It is found that such conductive strapping can so seriously disturb electrostatc fields in capacitive test cells that their response to moisture content are swamped in the error, and the advantageous electronic bulk measurements practices are foreclosed.

Nevertheless, according to the present teachings, the deleterious effects of conductive metal strapping are avoided, and accurate electronic capacitivity measurements are attainable, in improved test cell apparatus of permanently open construction which readily accepts and evaluates massive samples having strappings specially oriented in relation to the cell plates and in relation to certain unique field-masking provisions. The latter provisions serve to develop discrete narrow field "shadows" at critical locations where the strapping is oriented to suppress its influence upon measurements.

It is one of the objects of the present invention, therefore, to provide novel and improved measurement apparatus which is accurately responsive to capacitivity of materials bound with conductive metal strands.

Another object is to provide for the electronic measurement of moisture content of bulk samples having metallic strapping substantially perpendicular to the plates of a test cell.

A further object of this invention is to provide improved and highly stable capacitor test cell apparatus of permanently-open construction which develops a partly-masked electrostatic field enabling precise electronic evaluations of moisture content characteristics of metal-strapped bales.

In addition, it is an object to provide unique capacitor test cell apparatus including field-masking shields which isolate discrete portions of a sample from capacitivity measurements without obstructing movements of the sample.

By way of a summary account of practice of this invention in one of its aspects, there is provided in an electronic moisture detection system a reference oscillator the output frequency of which is regulated by the capacitance of a special form of test cell, this capacitance being related to the dielectric characteristics of a large metal-strapped bale of textile material disposed within the electrostatic measurement field of the cell. The cell structure includes two vertical broad-area conductive electrode plates mounted in a spaced and insulated parallel relationship on opposite sides of an intermediate measurement region sufficiently large to accommodate a massive metal-strapped bale of textile fibers, such as an elongated bale of wool top having one long metal strap, which encompasses it end-to-end, and a plurality of smaller transverse loop straps. Each of the electrode plates is separately enclosed and shielded by grounded conductive metal panelling except along the one side which is in confronting relationship to its companion electrode plate across the measurement region. Access to and egress from the measurement region are facilitated by permanent end openings in the framework which is used to secure the shielded electrode structures together, such that a bale which is to undergo evaluation may be carted or otherwise moved directly into and out of a predetermined measurement site, in the region between the plates. Preferably, certain stray fields disturbances in the open cell are minimized by electrically establishing a substantially ground level of potential in a plane appearing about midway between the two capacitor plates. Each of the two capacitor plates is partially masked along a substantially vertical center line by a grounded substantially vertical thin conductive shield which is spaced inwardly from it, toward the measurement site between the plates, by a small distance. Although a broad-area electrostatic field is developed between the plates when they are electrically excited by high-frequency signals, the substantially vertical planar region defined between the two shields remains comparatively free of such field, with the electrostatic flux lines which would otherwise traverse the measurement site being drawn to the grounded shields instead. Each bale having a metal strap loop binding it end-to-end is positioned in the measurement site with the plane of the strap loop substantially coincident with the field-free planar region, and this strapping is found to have no significant effect upon capacitivity measurements. Additional metal straps which may extend transversely to the end-to-end strapping of the bale lie in planes substantially parallel with the capacitor plates and thus do not materially influence the measurements. Proper calibration of the cell is periodically verified by pneumatic actuation of a special large form of slug into a predetermined orientation within the measurement space where it functions as a substitute for or equivalent to bales which the apparatus is designed to measure.

The subject matter regarded as my invention is particularly pointed out and distinctly claimed in the concluding portion of this specification. However, both as to preferred structure and assembly, and further in relation to objects and advantages thereof, this invention may be best understood through reference to the following description taken in connection with the accompanying drawings, wherein:

FIGURE 2 illustrates the apparatus of FIGURE 1 with certain system and circuit features being portrayed in block-diagrammed and schematic forms;

Figure 1:
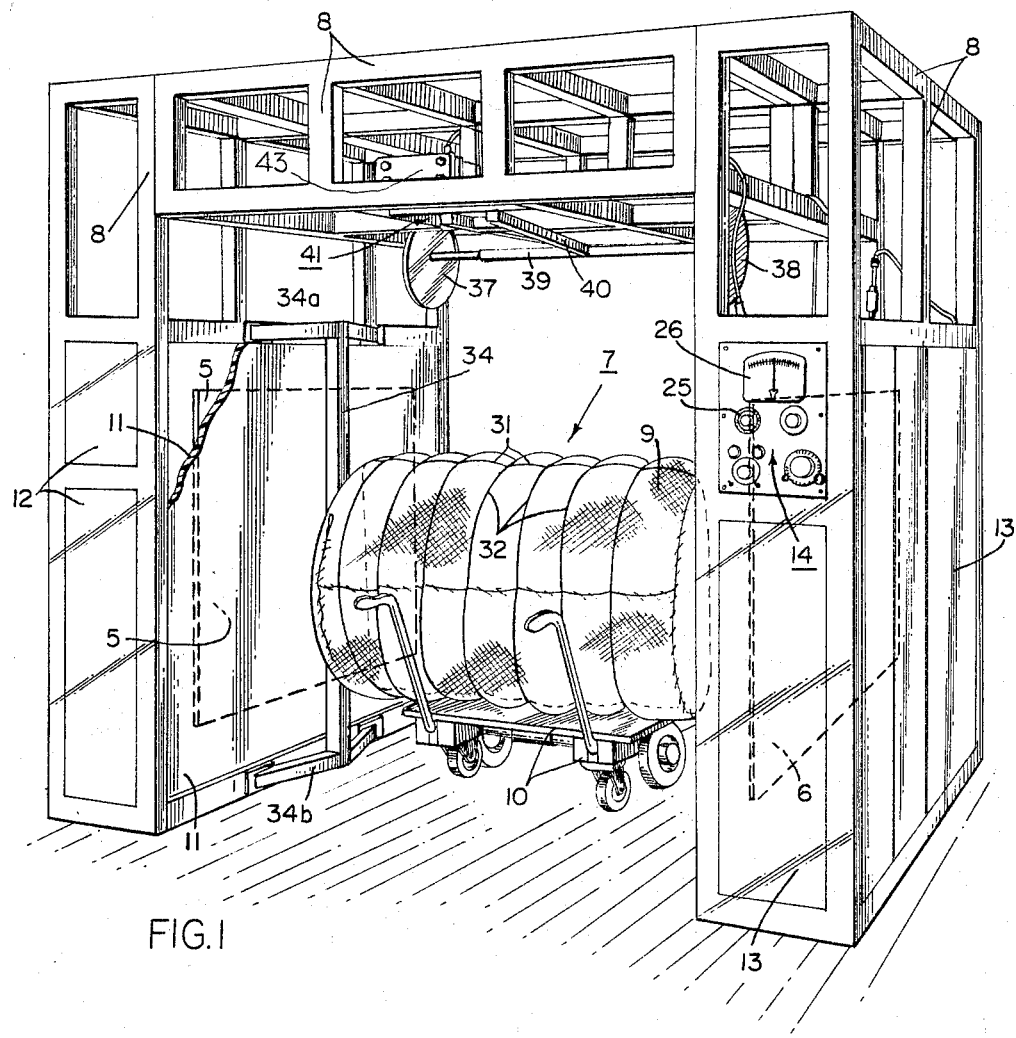
FIGURE 1 is a pictorial representation of a preferred form of moisture-detection apparatus including a test cell provided with field-masking shields which suppress disturbing influences of metal strapping on baled material under evaluation.
Figure 4:
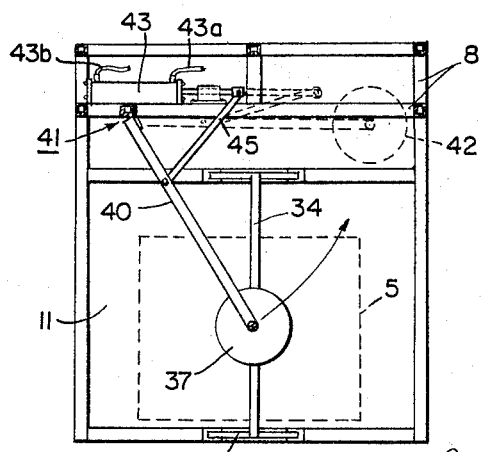

FIGURE 3 is a schematic diagram of the electrical circuit relationships between parts of the improved test cell and the frequency-determining circuit of a balanced oscillator, together with a dashed-line representation of a metal-strapped bale oriented for measurement purposes; and FIGURE 4 is a cross-sectioned side view of the test cell of FIGURE 1, depicting the reference slug provisions used for verifying calibration.

The embodying equipment illustrated in FIGURE 1 includes a capacitor test cell structure of an open-ended type wherein two conductive capacitor plates 5 and 6 are supported in precise spaced parallel alignment on opposite sides of a central measurement site 7 by sturdy metal framework 8. Both the front and rear ends of the structure exhibit permanent openings through which a massive strapped bale, 9, of textile material or the like, may conveniently be conveyed into and out of the measurement site on a hand truck 10, or other transporting mechanism. The wheels, axles, and other metallic portions of the truck are disposed at a level below that of the lower horizontal edges of the electrode plates 5 and 6, and are thus removed from the main electrostatic field developed between these plates; although portions of the truck floor and handles may be exposed to the field, these are of dielectric material (example: wood) which does not vary significantly in capacitivity and which causes negligible disturbance of the cell field for one measurement to the next. Electrodes 5 and 6 are of like broad areas sufficient to span more than the smaller cross-sectional areas of elongated bales received between them, and they need not themselves be of especially massive constructions because they are back-supported on and adhesively overlaid with stiff and rugged insulating panels, such as panel 11, made of plywood or other inexpensive structural panelling. These panels are also preferably faced on their exposed side with non-conductiv plastic sheeting of low dielectric constant, such as Formica, which provides a smooth abrasion-resistant surface which may easily be kept free of foreign matter.

Except for their electrical exposures to one another across the measurement site, the two electrode plates 5 and 6 are each separately enclosed and electrostatically shielded by grounded metal panelling, 12 and 13, respectively, such that all stray capacitances associated with the edges and shielded sides of these plates must remain substantially fixed and therefore cannot introduce measurement error. The sole variable capacitance effects which may be experienced are thus found in the regions of the measurement site and the cell openings. Preferably, the electrostatic field existing between the test cell electrodes should involve wholly parallel flux lines, having a substantially uniform density in distribution, extending perpendicularly to the spaced parallel electrodes. In practice, however, this condition is difficult to achieve unless, first, the cell is entirely closed and, second, the measured sample does not include field-distorting materials. The fact that ends of the cell are permanently open, to avoid the use of massive doors, leads to the possibility that stray fields may reach objects or operators near the openings; these particular tendencies are materially suppressed by preserving all of the metal framework and panelling at a ground potential while at the same time insuring that the instantaneous electrical excitations of electrodes 5 and 6 are simultaneously of opposite polarity and are of substantially equal potential displacements from the ground level. Under these conditions, the plane intermediate and parallel with the cell electrodes is preserved at the ground potential level and the fields thereabout have little tendency to stray or leak to outside objects of about the same potential. The associated electronic detection equipment, 14, is one which preserves the needed instantaneously-opposite electrode excitations. As shown in FIGURE 2, this electronic equipment includes a variable oscillator 15 which is of a special balanced type wherein the capacitance between test cell electrodes 5 and 6 is part of the frequency-determining tank circuit 16. The latter circuit involves components which are grounded intermediate their ends; in this connection, grounded tap 17 intermediate the two inductance halves 18 and 19 is coupled with the intermediate electrode structure 20 of a split-stator balanced variable capacitor 21, such that the opposite ends 22 and 23 of the capacitor 21 are at equal and opposite potentials alternatively above and below ground level as oscillations are developed in cooperation with the triode 24. Rotor 20 is adjustable by manipulation of a tuning knob 25. Cell electrodes 5 and 6 are coupled in parallel with the capacitor 21, such that the frequencies of oscillations are regulated by exhibited capacitance of the test cell alone when all else in the variable oscillator circuitry is unchanged. Voltage-dividing effects of the grounded center-tapped tank circuit inductance and capacitance units insure that the electrostatic field between the test cell electrodes has a potential gradient which crosses ground potential level about midway between plates 5 and 6. Preferably, the test cell capacitivities are translated into directly-readable indications of instrument 26, and, for this purpose, the output of variable-frequency oscillator 15 is combined with that of a reference oscillator 27 in a mixer 28. The reference oscillator is of a construction generally like that of the variable oscillator and is similarly responsive to changes in ambient environmental conditions, such that frequency drifts tend to be substantially the same and desirable self-cancellations of environment-induced errors will occur. The combination of oscillator outputs yields a component of further output signals which is substantially equal to the difference between oscillator frequencies, these differences being maintained within an audio frequency range. Detector-limiter 29 accomplishes a demodulation which results in a signal of frequency substantially equal to the difference in oscillator frequencies, and of constant amplitude irrespective of frequency. The output of detector-limiter 29 is in the form of pulses of uniform amplitude and of periodicities correspondng to the differences in oscillator frequencies. Discriminator 30, which is preferably of a non-resonant type, is excited by these pulses and responds by delivering direct current to instrument 26, in the form of a simple ammeter, which is also accurately related to the aforesaid frequency differences and to the measured capacitivities. Instrument 26 may thus be calibrated in terms of percentage moisture content, for purposes of measurement of bales having predetermined weights. If desired, further details as to circuitry and practices which may be exploited in the measurement system may be found in U.S. Patents Nos. 3,012,193 and 3,028,548.

The second, and major, difficulty encountered in attempts to perform electronic evaluations of moisture content results from the presence of metal wire- or band-strapping commonly used to secure bales, cartons, or other packaging of large quantities of material. It has been found that the conductive strapping can seriously disturb the electrostatic field pattern in capacitive test cells, rendering the measurements useless; although non-metallic bindings avoid such difficulties, they are not as satisfactory in many respects and it is highly important that either type of binding be accommodated when encountered. Otherwise, resort must be had to the prior troublesome baking and weighing practices, or, alternatively, the packaging could be stripped of its objectionable metal binding to permit accurate capacitivity measurements, although at the expense of much labor and delay. In the binding of bulky packages of materials, it is generally necessary that the metal strapping be looped in at least two mutually perpendicular planes, and, in the specific case of elongated burlap-bagged bales of textile materials, one strap is looped end-to-end about the bale in substantially one plane while several smaller transverse straps are looped in substantially parallel planes which are substantially perpendicular to the plane of the larger loop strap. By way of example, the burlap-covered elongated bale 9 in FIGURES 1–3, which represents a bulky packaging of wool top, is bound by a single long metal strap 31 tightly looped from end-to-end, as well as by several smaller transverse metal straps 32. Orientation of the smaller conductive straps in planes substantially parallel with the cell electrodes 5 and 6, as shown, eliminates any such material disturbance of the electrostatic flux lines 33 (FIGURE 3) as would impair measurement accuracy. This leaves only the larger conductive strap, 31, in a position where it could seriously disturb the capacitor field and prevent proper evaluation of moisture content influences on capacitivity. Its disturbing effects are suppressed, however, by locating it within an essentially field-free "shadow" created as the result of interposition of a pair of narrow shields 34, and 35, within the test cell. These shields are substantially vertical and parallel, and are each disposed close to but in spaced relationship from a different one of the electrodes, substantially midway therealong. Preferably, the shields are fashioned of sturdy metal members, such as box beams, which can readily withstand accidental impacts by the measured samples as they are moved into and out of the cell, and they are located alongside the intended measurement site. Both shields are grounded to the cell framework, and thus cause the nearby electrostatic field lines 5a and 6a (FIGURE 3) from electrodes 5 and 6 respectively to be drawn to them rather than to the intermediate metal strapping 31 of the bale under evaluation. The narrow region defined by linework 36 in FIGURE 3 is of about the same thickness as the shields and remains substantially free of the field, thereby isolating the included portion of the bale from the measurements. The textile material within that included portion is only a very minor part of the total contents of the bale, such that average moisture content measurement cannot be significantly erroneous. Capacitances existing between the shields and electrode plates are substantially constant and thus do not introduce measurement error; sturdy upper and lower bracketing 34a and 34b, and 35a and 35b, provides rigid grounded support of the shields relative to the plates and aids in preserving fixed capacitive relationships with the electrodes. The shields, and the substantially field-free narrow "shadow" which they develop through the measurement site, are of sufficient width to allow for the substantially full masking of the wire or band 31 even though it may not be perfectly planar or aligned exactly with the centers of the shields. Further, these shields are of sufficient vertical height to mask the full vertical expanses of end-to-end straps which may be encountered. Variations in the lengths and configurations of the end-to-end straps of different bales are thus rendered non-critical.

In those instances where more than one wire, metallic band, or the like, appears on a package in direction substantially perpendicular to the test cell electrodes, more than one pair of shields may also be incorporated into the test cell, at those positions where the conductive material is to be masked from the measurement. Preferably, the shields are disposed as close to the measured packages as convenience in transport of the packages will allow. In some designs, the shields may be directly interconnected with one another, and may extend fully or partly around the measurement site, although substantially in the plane where the masking effects are to be developed; this admits also of the use of shields which are not restricted to the perfectly straight form illustrated in connection with the preferred embodiment herein described in detail. Other test cell constructions may involve motorized automatic, rather than manual, conveyor provisions for positioning the measured sample within the measurement site, and accurate placements can be achieved with the aid of switches actuated by some part of package, preferably the wire strapping, to halt the conveyor operation when the sample is properly oriented.

Moisture-content evaluations are performed after the packages (bales, etc.) are weighed to determine the scale on which readings should be made, it being known that bulks of like weight should exhibit essentially the same capacitivities, with their deviation being accounted for by differences in moisture content. Bulk amounts of about the same weight are thus evaluated on a common scale of readings on instrument 26, or, when only one scale is provided, the readings may be corrected or, preferably, the instrument responses are modified electrically by simple manual adjustment of one of the control knobs of equipment 14. Periodically, the system calibrations is verified by introducing a so-called "slug" or reference sample into the measurement site and checking the indications which results; this enables correction to be introduced into the equipment, electrically and in known ways, to allow for variations in ambient environment conditions, such as temperature. For these purposes, the cell structure is fitted with a reference sample or slug in the form of a pair of spaced disks, 37 and 38, which may be made of a solid impervious dielectric material or metal, fixed at the ends of a crossarm 39 which is in turn suspended from a movable cantilever yoke 40 pivotally connected to the framework 8 at a forward position 41 (FIGURES 1 and 4) above the measurement site 7 and the electrode plates 5 and 6. Normally, this movable slugging assembly is drawn upwardly to the position illustrated in FIGURE 1, and by dashed linework 42 in FIGURE 4, where it cannot influence capacitivity measurements and cannot interfere mechanically with conveying of the samples. When the cell operating characteristics are to be investigated, a pneumatic piston-cylinder unit 43 which is fixed with the upper framework 8 is pressurized on one side via conduit 43a, thereby causing its movable actuating rod 44 to lower the pivoted slugging assembly precisely into a predetermined centralized orientation between the test cell electrodes (as shown in full linework in FIGURE 4). The alignment maintained by hinging of the cantilever mechanism, and the mechanical limit stopping effected by the members of knee joint 45 or other parts of the pneumatic slugging arrangement, insure that the disks 37 and 38 will be repeatedly brought to the same orientation between cell electrodes during successive actuations. This is important for purposes of avoiding inaccuracies which may result from slight differences in slug orientations; unguided manual positioning of reference samples or slugs tends to be unsatisfactory because of such inaccuracies. Pneumatic excitations of unit 43 in the opposite sense via conduit 43b cause the knee joint 45 to be buckled with consequent elevation of the slugging assembly to the fully-raised position where it is wholly removed from the cell field. Circuit adjustments of the type usually made when a reference is manually placed in the cell are executed when the pneumatically-actuated assembly is lowered; these adjustments enable the detection circuitry to take into account the effects of ambient temperature conditions, for example. In those instances when the interconnected grounded disks 37 and 38 are formed of conductive metal, they are effective to influence the cell capacitivity over a substantial cell volume (i.e. in the space between them), without at the same time being of such massive constructions as may be required in the case of references of dielectric material. The lightweight metallic disks must be held in precise alignment, however, if errors are to be suppressed, and the pivoted slugging assembly successfully achieves this objective. Areas of the disks 37 and 38 are smaller than those of the cell electrodes, such that the cell is not completely screened or shorted during the calibration and, instead, the paired disks create only a predetermined partial reference disturbance or shorting of the cell field, to approximate the effects of a predetermined sample (such as a bale). Preferably, the disks are aligned symmetrically with the shields 34 and 35 during the calibration, and the disks are widely spaced to short out or shield a relatively large field volume without unduly masking the electrodes in directions parallel with them.

The test cell configurations and proportions may of course be varied to meet requirements and convenience in the testing of materials and samples which are of sizes and shapes different from those which have been referred to. In particular, it should be understood that certain cells may be fully or more completely closed than that illustrated, that automatic conveyor equipment of known types may be associated with the improved cell, that the slugging assembly may be manually cranked or pneumatically, hydraulically, or electrically actuated and controlled by known types of mechanisms, that the slugging members may be of configuration other than circular and other than substantially flat, that the grounded shields may extend horizontally or both horizontally and vertically or otherwise to mask perpendicular metallic bindings in whatever planes they may appear on packaging, that the broad-area electrode plates may be discontinuous at those positions where the shields confront them, and that the electrode plates and shields may be curved or otherwise shaped to meet varied measurement needs. Accordingly, although preferred embodiments of this invention have been shown and described herein, those skilled in the art will recognize that various changes, modification and substitutions may be effected without departing either in spirit or scope from the invention in its broader aspects as set forth in the appended claims.

What I claim as new and desire to secure by Letters Patent of the United States is:

1. Apparatus responsive to electrical influences of substances within an electrostatic field and adapted to be coupled into an electrical measurement system, comprising spaced broad-area electrode surface means, means mounting said electrode surface means in electrically insulated relationship with a hollow measurement site therebetween for accommodating quantities of said substances, a pair of conductive shields, means mounting said shields in oppositely-disposed relationship across said measurement site and each in closely-spaced relationship to a different one of said electrode surface means, and means maintaining potential differences between each of said shields and the electrode surface means in closely-spaced relationship thereto, whereby said shields attract field flux in the vicinity thereof and thereby define a substantially field-free region within a portion of said measurement site.

2. Apparatus responsive to capacitivity of substances and adapted to be coupled into an electrical measurement system, comprising a pair of spaced broad-area conductive electrode means, means mounting said electrode means in electrically insulated relationship with a hollow measurement site therebetween for accommodating quantities of said substances, conductive shielding means including at least two conductors, means mounting said conductors in oppositely-disposed relationship across said measurement site and each in closely-spaced confronting relationship to a different one of said electrode means, and means maintaining potential differences between each of said conductors and the electrode means in closely-spaced relationship thereto, whereby said conductors attract field flux in the vicinity thereof and thereby define a substantially field-free region within a portion of said measurement site.

3. Apparatus responsive to capacitivity of substances as set forth in claim 2 wherein said conductors are relatively narrow in comparison with the expanse of said electrode means and are mounted to extend across the field between said electrode means inwardly of the extremities thereof and in substantially transverse relationship to the lines of field flux in said measurement site.

4. Apparatus responsive to capacitivity of substances as set forth in claim 3 wherein said narrow conductors are mounted in substantially one plane which is substantially perpendicular with said lines of field flux in said measurement site.

5. Apparatus responsive to capacitivity of substances as set forth in claim 4 wherein said electrode means are substantially planar and parallel, wherein said conductors are substantially linear and parallel with said electrode means, and further including means electrically interconnecting said conductors and maintaining said conductors at the same potential level.

6. Apparatus responsive to capacitivity of substances and adapted to be coupled into an electrical measurement system, comprising a pair of spaced broad-area capacitor electrodes, means mounting said electrodes in electrically insulated relationship with a hollow measurement site therebetween for accommodating quantities of said substances, electrical circuit means responsive to capacitance therein producing at two terminals thereof instantaneous potentials which are simultaneously of opposite polarities in relation to an intermediate potential level, means coupling said electrodes with different ones of said terminals and thereby introducing the capacitance between said electrodes into said circuit means and applying said instantaneous potentials across said electrodes to generate an electrostatic field in said measurement site having a potential gradient determined by said instantaneous potentials, conductive shielding means including at least one pair of narrow conductor elements, means mounting each of said conductor elements in the electrostatic field between said electrodes in closely-spaced relationship to a different one of said electrodes and in relatively widely-spaced relationship to the other of said conductor elements and in substantially the same thin planar region with the other of said conductor elements, and means maintaining said conductive shielding means at said intermediate potential level, whereby said conductor elements attract field flux from said electrodes in the vicinity thereof and substantially mask the electrostatic field from said thin planar region in said measurement site.

7. Apparatus responsive to capacitivity of substances as set forth in claim 6 wherein said conductor elements are elongated to extend outwardly beyond the expanses of said electrodes with which they are closely spaced, and wherein said intermediate potential level comprises a ground potential level.

8. Apparatus responsive to capacitivity and adapted to respond to electrical influences of packaged dielectric substances strapped with metal within an electrostatic field and adapted to be coupled into an electrical measurement system, comprising spaced broad-area electrodes, means mounting said electrodes in electrically insulated relationship with a hollow measurement site therebetween of proportions adapted to accommodate strapped packaged substances therein with at least one metal strapping member thereof looped substantially in a plane substantially parallel with lines of field flux extending between said electrodes, conductive shielding means including at least one pair of relatively narrow conductor elements which are of greater breadth than the strapping member, means mounting each of said conductor elements in the electrostatic field between said electrodes in closely-spaced relationship to a different one of said electrodes and in a relatively widely-spaced aligned relationship to the other of said conductor elements which permits such packaged substances to be received therebetween without obstruction, said conductor elements being aligned in a substantially planar region of greater breadth than that of such strapping member, and means maintaining each of said conductor elements at electrical potential different from that of the electrode with which it is closely spaced.

9. Apparatus responsive to capacitivity and adapted to respond to capacitivity of packaged dielectric substances strapped with metal and adapted to be coupled into an electrical measurement system, comprising spaced broad-area electrodes, means mounting said electrodes in electrically insulated relationship with a hollow measurement site therebetween of proportions adapted to accommodate strapped packaged substances therein with at least one metal strapping member looped substantially in a plane substantially parallel with lines of field flux extending between said electrodes, conductive shielding means including at least one pair of relatively narrow conductor elements which are of greater breadth than such a strapping member, means mounting each of said conductor elements in the electrostatic field between said electrodes in closely-spaced relationship to a different one of said electrodes and in a relatively widely spaced aligned relationship to the other of said conductor elements which permits the packaged substances to be received therebetween without obstruction, said conductor elements being aligned in a substantially planar region of greater breadth than that of such a strapping member, means for mechanically orienting a packaged substance within said measurement site with the plane of a looped strapping member thereof disposed within said planar region between said conductor elements, and means maintaining said conductor elements at an electrical potential different from potentials at said electrodes, whereby electrostatic field flux from said electrodes is attracted to said conductor elements in the immediate vicinity thereof and said planar region containing such a metal strapping member is preserved substantially free of field flux while the remainder of the measurement site is traversed by field flux from said electrodes.

10. Apparatus responsive to capacitivity as set forth in claim 9 further comprising electrical circuit means applying to said electrodes potentials of instantaneously opposite polarities in relation to a ground potential, and wherein said different potential comprises said ground potential.

11. Apparatus responsive to capacitivity as set forth in claim 10 wherein said electrodes are substantially planar and parallel, wherein said conductor elements are substantially linear and parallel with one another and with said electrodes and are sufficiently elongated to extend outwardly beyond said measurement site, and further comprising electrically conductive shielding material in enclosing and insulating relationship to surfaces of said electrodes other than surfaces thereof confronting said measurement side and said conductor elements, and means maintaining said shielding material at said ground potential.

12. The method of testing packaged dielectric substances which comprises generating an electrostatic flux field between a pair of electrodes having a hollow measurement site between them, intercepting lines of field flux from the electrodes within relatively small areas at localized positions near the electrodes on opposite sides of said measurement site and thereby creating a substantially field-free region through said measurement site, positioning a packaged dielectric substance within said measurement site with predetermined portions thereof in said field-free region, and measuring the capacitivity exhibited between the electrodes.

13. The method of testing a packaged dielectric substance having at least one metal binder looped about it which comprises generating an electrostatic flux field between spaced electrode surfaces having a hollow measurement site therebetween, intercepting lines of field flux from the electrode surfaces within oppositely disposed relatively narrow and elongated areas near each of the electrode surfaces on opposite sides of the measurement site and thereby creating a substantially field-free thin planar region through said measurement site, positioning a packaged dielectric substance within said measurement site with the metal binder thereof lying within said substantially field-free region, and measuring the capacitivity exhibited between the electrode surfaces.

14. The method of testing a packaged dielectric substance having at least one metal binder loopd about it which comprises generating an electrostatic flux field between spaced electrodes having a hollow measurement site therebetween, establishing in the near vicinity of each of the electrodes and along elongated narrow conductive paths on opposite sides of said measurement site electrical potential conditions different from those at the nearby electrodes, thereby intercepting electrostatic flux lines from the electrodes and creating a substantially field-free thin planar region through said measurement site, positioning a packaged dielectric substance within said measurement site with the metal binder thereof lying fully within said substantially field-free region, and measuring the capacitivity exhibited between the electrodes.

15. The method of evaluating moisture content of bales of textile material having a first metal strap looped about the bale in substantially one plane at least one other metal strap looped about the bale in a plane substantially perpendicular to said one plane, which comprises generating an electrostatic flux field between spaced electrodes polarized oppositely in relation to a ground potential and having a hollow measurement site therebetween, establishing the ground potential in the near vicinity of each of the electrodes and along elongated narrow conductive paths on opposite sides of said measurement site and thereby intercepting electrostatic flux lines from the electrodes and creating a substantially field-free region through said measurement site, positioning a packaged dielectric substance within said measurement site with said first metal strap lying fully within said substantially field-free region and with said other metal strap extending transversely in relation to lines of field flux in said measurement site, and measuring the capacitivity exhibited between the electrodes.

16. Apparatus responsive to capacitivity of substances in bulk form and adapted to be coupled into an electrical measurement system, comprising spaced broad-area electrodes, framework means mounting said electrodes in spaced electrically insulated relationship with a hollow measurement site therebetween for accommodating bulk quantities of said substances, conductive shielding means including at least one pair of narrow conductor elements, means mounting each of said conductor elements in oppositely-disposed relationship across said measurement site and each in closely spaced confronting relationship to a different one of said electrode means, a reference slug of non-hygroscopic material, means on said framework means supporting said slug and guiding movements thereof between a first predetermined position within said measurement site and a second position wherein said slug is wholly outside of said measurement site between said electrodes, said slug movements being in direction substantially transverse to the direction of electrostatic lines of flux between said electrodes, and said slug being of lesser dimensions in directions parallel with said lines of flux than the minimum spacing between said conductor elements, means maintaining potential differences between said conductor elements and said electrodes, and means for selectably moving said slug between said first and second positions.

References Cited by the Examiner

UNITED STATES PATENTS

| | | | |
|---|---|---|---|
| 2,428,700 | 10/1947 | Eilenberger | 324—61 |
| 2,435,880 | 2/1948 | Eilenberger | 324—60 |
| 2,659,039 | 11/1953 | Bourgonnier et al. | 317—253 |
| 2,766,623 | 10/1956 | De Giers | 317—246 X |
| 3,028,548 | 3/1962 | Breen | 324—61 |

WALTER L. CARLSON, *Primary Examiner.*

E. E. KUBASIEWICZ, *Assistant Examiner.*